United States Patent
Badr et al.

(10) Patent No.: US 11,425,071 B2
(45) Date of Patent: *Aug. 23, 2022

(54) UNIFORM RESOURCE IDENTIFIER AND IMAGE SHARING FOR CONTEXTUAL INFORMATION DISPLAY

(71) Applicant: Google LLC, Mountain View, CA (US)

(72) Inventors: Ibrahim Badr, Zurich (CH); Paige Alexis Dunn-Rankin, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,927

(22) Filed: Dec. 14, 2020

(65) Prior Publication Data

US 2021/0099410 A1    Apr. 1, 2021

Related U.S. Application Data

(63) Continuation of application No. 16/241,429, filed on Jan. 7, 2019, now Pat. No. 10,880,247, which is a
(Continued)

(51) Int. Cl.
*H04L 51/10* (2022.01)
*G06F 16/955* (2019.01)
(Continued)

(52) U.S. Cl.
CPC .......... *H04L 51/10* (2013.01); *G06F 16/5838* (2019.01); *G06F 16/955* (2019.01);
(Continued)

(58) Field of Classification Search
CPC ..... H04L 51/10; H04L 12/4625; H04L 51/18; H04L 51/046; G06F 16/5838; G06F 16/955; G06F 9/445; G06T 1/0007
See application file for complete search history.

(56) References Cited

U.S. PATENT DOCUMENTS 7,389,181 B2   6/2008   Meadow et al.
7,689,613 B2   3/2010   Candelore
(Continued)

FOREIGN PATENT DOCUMENTS

CN          104052762          9/2014

OTHER PUBLICATIONS

"10 Mobile Astronomy Apps for Stargazers," [online] Retrieved on Apr. 29, 2014]; Retrieved from the Internet URL: bitp://mashable.coin/2011/06/21/a s tronomv-mobil e-appsl, 2011, 13 pages Nov. 21, 2011.
(Continued)

*Primary Examiner* — Patrice L Winder
(74) *Attorney, Agent, or Firm* — Middleton Reutlinger

(57) ABSTRACT

Methods, systems, and apparatus, including computer programs encoded on a computer storage medium, for generating, in response to a single input operating system command that is invoked independent of a native application, a message that includes an image of a particular environment instance of the native application that was displayed when the single input operating system command and a uniform resource identifier of the particular environment instance of the native application.

15 Claims, 5 Drawing Sheets

Related U.S. Application Data continuation of application No. 15/269,238, filed on Sep. 19, 2016, now Pat. No. 10,212,113.

(51) Int. Cl.

| | | |
|---|---|---|
| *G06F 16/583* | (2019.01) | |
| *H04L 51/18* | (2022.01) | |
| *H04L 51/046* | (2022.01) | |
| *H04L 12/46* | (2006.01) | |
| *G06T 1/00* | (2006.01) | |
| *G06F 9/445* | (2018.01) | |

(52) U.S. Cl.
CPC ........ *G06T 1/0007* (2013.01); *H04L 12/4625* (2013.01); *H04L 51/18* (2013.01); *G06F 9/445* (2013.01); *H04L 51/046* (2013.01)

(56) References Cited

U.S. PATENT DOCUMENTS

| | | | |
|---|---|---|---|
| 7,788,266 | B2 | 8/2010 | Venkataraman et al. |
| 8,316,019 | B1 | 11/2012 | Ainslie et al. |
| 8,321,406 | B2 | 11/2012 | Garg et al. |
| 8,391,618 | B1 | 3/2013 | Chuang et al. |
| 8,392,435 | B1 | 3/2013 | Yamauchi |
| 8,515,185 | B2 | 8/2013 | Lee et al. |
| 8,521,764 | B2 | 8/2013 | Pfleger |
| 8,543,675 | B1 | 9/2013 | Yiu et al. |
| 8,606,781 | B2 | 12/2013 | Chi et al. |
| 8,898,095 | B2 | 11/2014 | Agrawal et al. |
| 9,116,952 | B1 | 8/2015 | Heiler et al. |
| 9,135,305 | B2 | 9/2015 | Taubman et al. |
| 9,253,170 | B2 | 2/2016 | Linga et al. |
| 9,582,154 | B2 | 2/2017 | Greenberg et al. |
| 9,699,271 | B2 | 7/2017 | Brander et al. |
| 9,830,391 | B1 | 11/2017 | Bakir et al. |
| 10,001,903 | B2 | 6/2018 | Yi et al. |
| 10,091,628 | B2 | 10/2018 | Nirantar et al. |
| 10,228,831 | B2 * | 3/2019 | Sankaranarasimhan ............... H04L 67/18 |
| 10,237,621 | B2 | 3/2019 | Sharma et al. |
| 2001/0053968 | A1 | 12/2001 | Galitsky et al. |
| 2007/0060114 | A1 | 3/2007 | Ramer et al. |
| 2007/0071320 | A1 | 3/2007 | Yada |
| 2007/0140595 | A1 | 6/2007 | Taylor et al. |
| 2007/0192734 | A1 | 8/2007 | Berstis et al. |
| 2007/0214131 | A1 | 9/2007 | Cucerzan et al. |
| 2008/0046405 | A1 | 2/2008 | Olds et al. |
| 2008/0270110 | A1 | 10/2008 | Yurick et al. |
| 2010/0070842 | A1 | 3/2010 | Aymeloglu et al. |
| 2010/0229045 | A1 | 9/2010 | Schultz et al. |
| 2010/0257450 | A1 | 10/2010 | Go et al. |
| 2010/0306249 | A1 | 12/2010 | Hill et al. |
| 2011/0035406 | A1 | 2/2011 | Petrou et al. |
| 2011/0038512 | A1 | 2/2011 | Petrou et al. |
| 2011/0055912 | A1 | 3/2011 | Fusari et al. |
| 2011/0125735 | A1 | 5/2011 | Petrou |
| 2011/0128288 | A1 | 6/2011 | Petrou et al. |
| 2011/0131241 | A1 | 6/2011 | Petrou et al. |
| 2011/0137895 | A1 | 6/2011 | Petrou et al. |
| 2012/0109858 | A1 | 5/2012 | Makadia et al. |
| 2012/0191745 | A1 | 7/2012 | Velipasaoglu et al. |
| 2012/0215533 | A1 | 8/2012 | Aravamudan et al. |
| 2013/0024677 | A1 | 1/2013 | Smith et al. |
| 2013/0024812 | A1 * | 1/2013 | Reeves ............... G06F 3/1454 715/810 |
| 2013/0055078 | A1 | 2/2013 | Berger et al. |
| 2013/0111001 | A1 | 5/2013 | Hamilton et al. |
| 2013/0132361 | A1 | 5/2013 | Chen et al. |
| 2013/0207982 | A1 | 8/2013 | Lehtimaki et al. |
| 2013/0227453 | A1 | 8/2013 | Tsai |
| 2013/0275531 | A1 | 10/2013 | Hahm et al. |
| 2013/0304855 | A1 | 11/2013 | Chor |
| 2013/0346400 | A1 | 12/2013 | Ramsey et al. |
| 2014/0046935 | A1 | 2/2014 | Bengio et al. |
| 2014/0172881 | A1 | 6/2014 | Petrou et al. |
| 2014/0365462 | A1 | 12/2014 | Chang |
| 2015/0058318 | A1 | 2/2015 | Blackwell et al. |
| 2015/0119002 | A1 * | 4/2015 | Chen ............... H04L 67/34 455/414.1 |
| 2015/0286737 | A1 | 10/2015 | Cattone et al. |
| 2015/0294433 | A1 | 10/2015 | Ye et al. |
| 2016/0132342 | A1 | 5/2016 | Yang et al. |
| 2017/0010790 | A1 | 1/2017 | Glover et al. |
| 2017/0024100 | A1 | 1/2017 | Pieper et al. |

OTHER PUBLICATIONS

"Google announces Search by Image and Voice Search for desktop, revamped mobile search," [online] Jun. 14, 2011 Retrieved on Mar. 22, 2017] Retrieved from the Internet URL: https://www.engadgetcom/2011/06/14/google-announces-search-by-image-search-by-voice-for-desktop/> 1 page Jun. 14, 2011.

"Google's Impressive "Conversational Search" Goes Live On Chrome," [online] Retrieved on May 5, 2014]; Retrieved from the Internet URL: irtip://searchenginaind.comogles-impressive- conversational-search-goes-line-on-chrome-160445, 2013, 12 pages 2013.

Zhang et al., "Probabilistic Query Rewriting for Efficient and Effective Keyword Search on Graph Data," Proceedings of the VLDB Endowment 6(14):1642-1653, 2013, 12 pages 2013.

China Intelectual Property; Notice of Allowance issue in Application Serial No. CN 201780069465.4; 5 pages; dated Jan. 13, 2021.

European Patent Office; Intention to Grant issued in Application No. 17765529.7; 39 pages; dated Apr. 15, 2021.

International Search Report and Written Opinion issued in the International Application No. PCT/US2017/049547, dated Dec. 1, 2017, 15 pages.

Written Opinion issued in International Application No. PCT/US2017/049547, dated Aug. 7, 2018, 9 pages.

European Patent Office; Examination Report issued in Application No. EP17765529.7; 9 pages; dated Apr. 24, 2020.

China Intelectual Property; Office Action issue in Application Serial No. CN 201780069465.4; 10 pages; dated Oct. 30, 2020.

\* cited by examiner

UNIFORM RESOURCE IDENTIFIER AND IMAGE SHARING FOR CONTEXTUAL INFORMATION DISPLAY

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. Search engines crawl and index these resources to facilitate searching of the resources.

Furthermore, with the advent of tablet computers and smart phones, native applications that facilitate the performance of the same functions facilitated by the use of web page resources are now being provided in large numbers. Additionally, native applications that do not have websites with synchronous content, such as games, are also very popular on tablet computers and smart phones. Accordingly, search engines now also facilitate searching of these native applications.

A user may desire information related to a web page resource or a native application that is currently active on a user device. Such information is referred to as "contextual information," as the information desired by the user is in the context of the active web page or native application.

In the context of native applications, users may also desire to share information about the native application with other users. Some systems allow users to take a screen shot of a particular environment instance of a native application and send the screen shot to other users. Users can also manually input or select information about a native application and send this information to other users as well.

SUMMARY

This specification relates to sharing contextual information of an active native application on a first user device with other user devices.

In general, one innovative aspect of the subject matter described in this specification can be embodied in methods that include the actions of displaying, on a display of the user device, a particular environment instance of a native application that can display a plurality of different environment instances, wherein the native application is an application operable to generate the environment instances for display within the native application on the user device and operates independent of a browser application that can operate on the user device; receiving, at the user device and while the particular environment instance is an active focus of the display, a single input operating system command that is a command invoked independent of the native application; in response to the single input operating system command: displaying, on the display, a contextual information card that includes a share command and at least one or more additional commands; in response to a selection of the share command: determining a recipient address specifying a recipient device that is separate from the user device, generating an image of the particular environment instance of the native application, selecting a uniform resource identifier of the particular environment instance of the native application, generating a message that includes the image of the particular environment instance and the uniform resource identifier, and sending, to the recipient address, the message that includes the image of the particular environment instance and the uniform resource identifier. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Particular embodiments of the subject matter described in this specification can be implemented so as to realize one or more of the following advantages. Contextual information that includes a screen shot of an active native application and a uniform resource identifier (URI) for the particular environment instance of the native application captured in the screen shot can be shared by use of an intuitive, easy-to-use interaction model. This enables a user to quickly share desired information about a native application with other users, and enables the other users to instantiate, e.g., launch or install and launch, the native application on their receiving devices to process the URI and generate the same, or similar, environment instance depicted in the screens shot.

Also, because the input of the query-independent request for contextual information does not require a query input and the share command does not require manual selection of a URI, the system does not need to perform text-to-speech processing or process typing input. This results in fewer input errors and erroneously input queries. Accordingly, when considered in the aggregate, thousands of erroneous and inaccurate queries and messages are avoided, which in turn, provides a more efficient use of network resources. This improves the technological field of search processing and information sharing among users, and is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A user device implementing the systems and methods described below enables the capture of a screen shot of an active native application and a uniform resource identifier for the particular environment instance of the native application captured in the screen shot. This capture of this information and the sharing is achieved by use of an intuitive, easy-to-use contextual interaction model.

As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific. Each particular environment instance of the native application is specified by a "deep link," which may otherwise be referred to as a uniform resource identifier (URI). The URI may be constructed according to a particular standard, or may be of a structure that is unique to the particular native application. The URI causes the native application to instantiate an instance of the specified native application.

By use of a single input operating system command, a user may receive contextual information related to an active environment instance of a native application. The user may then select a share command that generates a message that includes a screen shot of the active environment instance of a native application, and a "deep link," e.g., a uniform resource identifier, of the active environment instance. This user may then send the screen shot and the deep link in a single message to one or more other users. Upon receipt, each receiving user may view the screen shot. Should the viewing user desire to instantiate the same native application on the receiving device, the user may select a command, e.g., interacting with the image a certain way, such as "long pressing," to instantiate the native application on the receiving device. The native application may then process the URI to generate the same (or similar) environment instance.

These features and additional features are described in more detail below.

Figure 1A:
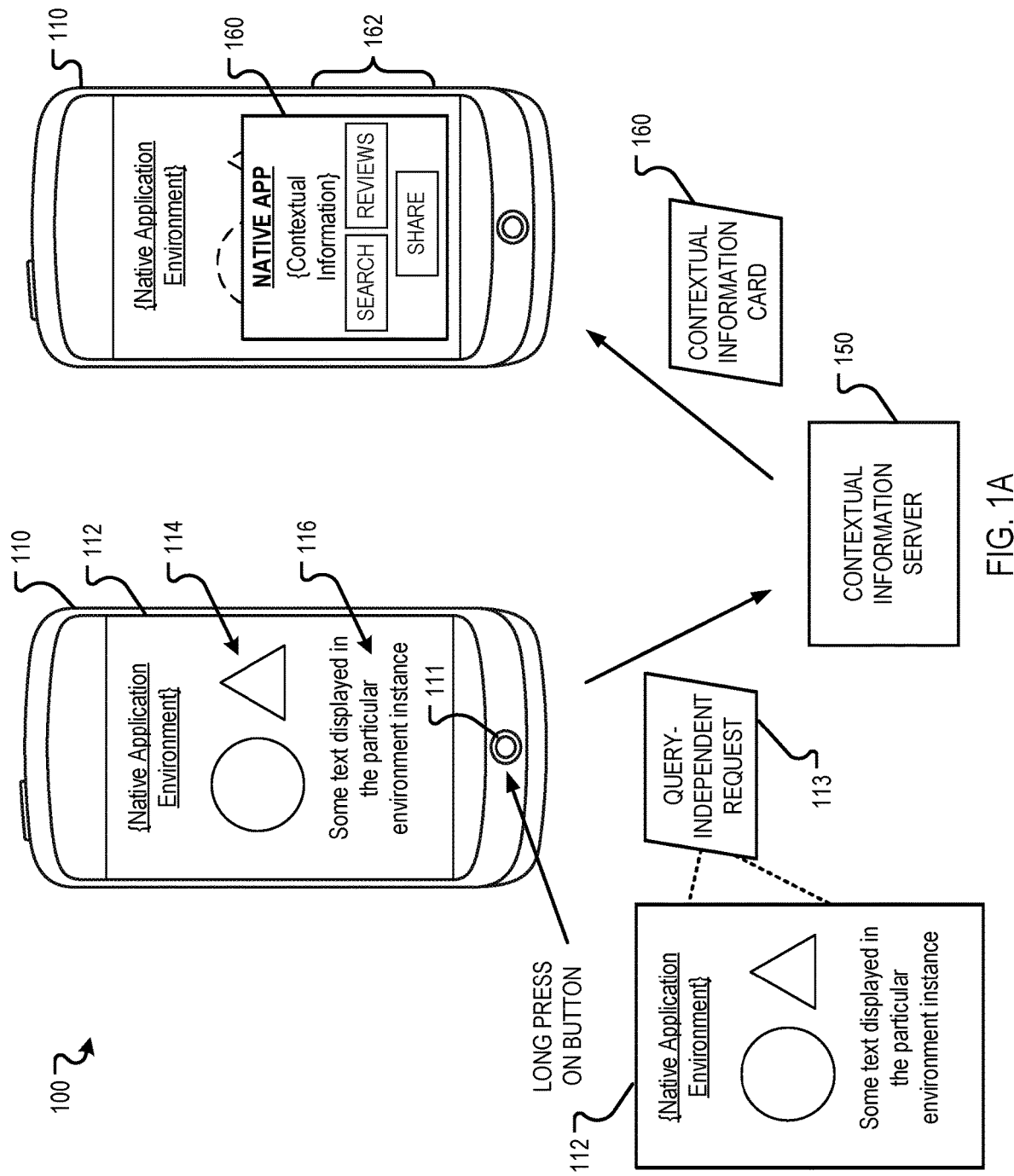
FIGS. 1A and 1B are block diagrams of example environments in which contextual information is provided for a native application and a screen shot of the native application and a uniform resource identifier (URI) are shared.
Figure 1B:
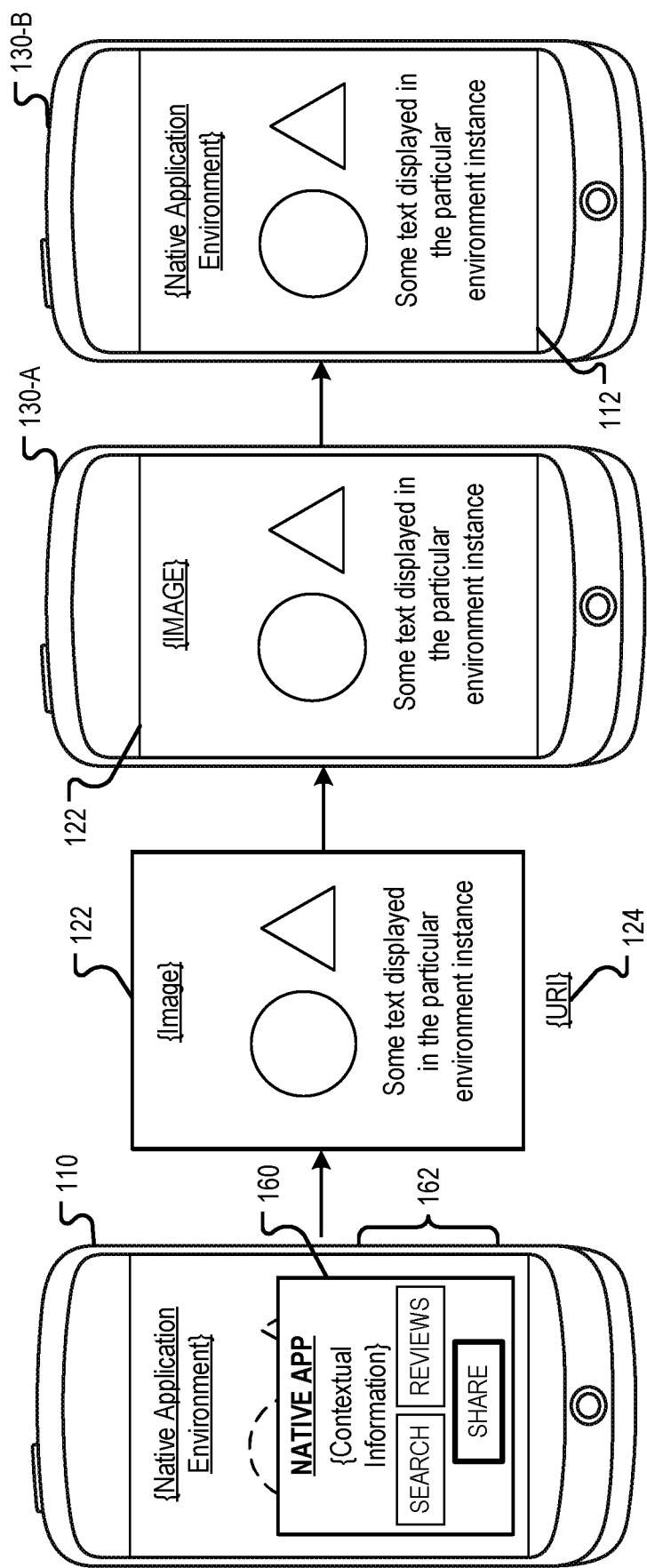

FIGS. 1A and 1B are block diagrams of example environments in which contextual information is provided for a native application and a screen shot of the native application and a uniform resource identifier (URI) are shared. FIG. 1A, in particular, depicts the requesting and receiving of a contextual information card when a particular environment instance of a native application is active, and FIG. 1B, in particular, depicts the sharing of a screen shot of the particular environment instance of the native application along with deep link to the particular environment instance.

With reference to FIG. 1A, a user device 110 is used by a user to obtain contextual information for a native application. The user device 110 is an electronic device that is capable of requesting and receiving resources over the network. Example user devices 110 include mobile communication devices (e.g., smart phones or tablets), and other devices that can send and receive data over the network. The native application is operating and a particular environment instance 112 is the active focus, e.g., the active window and immediately responsive to inputs received at the display of the user device 110.

The user device can also display other information, such as web resources. These may include HTML pages, electronic documents, images files, video files, text message conversations, e-mails, graphical user interfaces of applications, etc. Like a native application environment instance, a resource may also be an active focus of the display. For brevity, an active resource or an active native application environment instance is referred to as "active content."

The user device 110 detects that a user desires contextual information for the active content. For example, the user device 110 may be displaying a particular native application environment instance 112 and the active focus may be on the environment instance 112. The environment instance 112 may include, for example, graphics 114 and text 116. The user may generate an indication for contextual information, e.g., by pressing a button 111, e.g., a "home" button, for three seconds or tapping the screen according to a predefined tap pattern, etc. Such a command is, in some implementations, a single input operating system command that is invoked independent of the native application independ. In other words, the same command can be used across multiple different native applications and web resources.

Assume for illustrative purposes the user performs a long press that indicates that the user desires contextual information for the particular native application environment instance 112. In response, the user device 110 provides a query-independent request 113 to the contextual information server 150 for contextual information for the particular native application environment instance 112. For example, the user device 110 may provide a request that includes a screenshot of the particular native application environment instance, information about the native application, the URI of the particular native application environment instance, etc.

The request may be considered a query-independent request as the user device 110 provides the request to the contextual information server 150 without having the user enter terms for a query, whether verbally, physically, or some other interaction. For example, after the user device 110 detects that a user has long pressed a button, the user device 110 may provide the request to the contextual information server 150 without requesting additional information from the user.

In response to providing the request to the contextual information server 150, the user device 110 then receives one or more user interface elements from the contextual information server 150. As shown in FIG. 1A, the information received is a contextual information card 160. However, other user interface elements may be used, for example, chat bubbles, selectable linked notes or footnotes, etc. The contextual information card 160 may include contextual information about the native application and/or the particular environment instance of the native application, such as images, text, audio, and video, and one or more commands 162. As shown in FIG. 1A, the commands 162 include a search command that may invoke a separate search in a search user interface, a reviews command that may retrieve reviews of the native application, and a share command, which may generate a screen shot of the environment instance 112 and a URI of the environment instance and send the screen shot and the URI to another user device.

Figure 2:
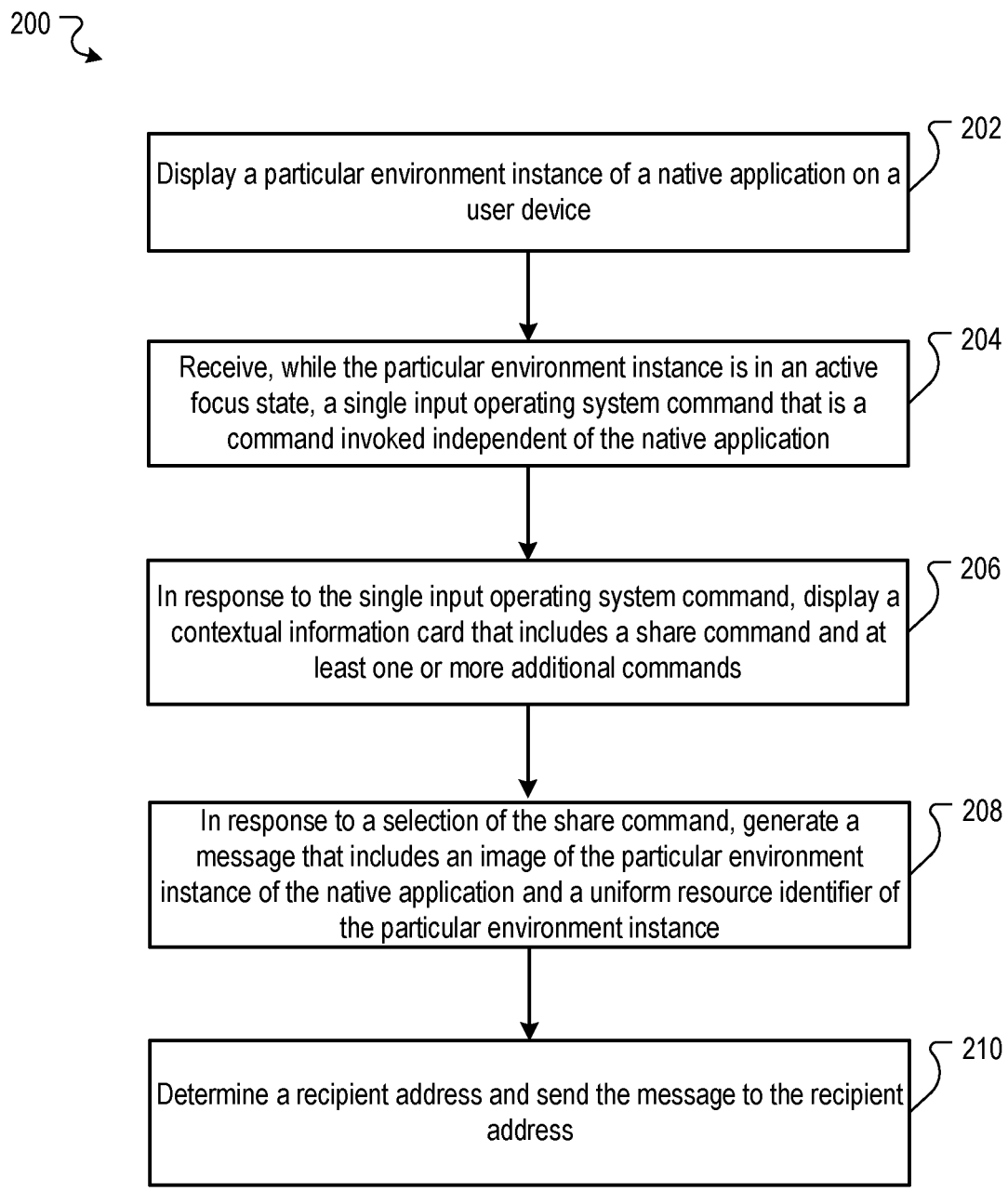
FIG. 2 is a flow diagram of an example process for sharing an image and a URI of a native application.

FIG. 1B depicts a process flow in response to a selection of a share command in the contextual information card 160. The process flow is described primarily with reference to FIG. 2, which is a flow diagram of an example process 200 for sharing an image and a URI of a native application.

In FIG. 1B, the contextual information card 160 has the active focus of the user device 110, as it is displayed in the foreground. To further emphasize the active focus on the card 162, the particular environment instance 112 on the user device 110 may be shaded or displayed beneath a slightly opaque layer, as illustrated by the phantom lines of the image elements.

To arrive at the state in FIG. 1B, the user device first displayed a particular environment instance of a native application (202), and received, while the particular environment instance was in the active focus state, a single input operating system command that is a command invoked independent of the native application (204). For example, in FIG. 1A, the user device 110 displayed the environment instance 112 and while the environment instance 112 was the active focus of the user device, the user device received a long press of the home button 111.

In response to the single input operating system command, the user device displays a contextual information card that includes a share command and at least one or more additional commands (206). For example, in FIG. 1B, the user device 110 received the contextual information card 160 and displayed the card 160. The card 160 includes a "share" command, and, as illustrated by the bold outline, the share command has been selected.

In response to a selection of the share command, the user device generates a message that includes an image 122 of the particular environment instance 112 of the native application and a uniform resource identifier 124 of the particular environment instance (208). The image 122 may be generated by invoking a system command that generates an image from the viewport data for the native application.

The uniform resource identifier 124 of the particular environment instance 112 of the native application may be, for example, selected from a user device cache of most recently used uniform resource identifiers. For example, the operating system of the user device 110 may track in a local history cache the uniform resource identifiers most recently selected by each native application. In a variation of this implementation, each native application may be configured to provide the uniform resource identifiers it processes to the cache.

Alternatively, the uniform resource identifier 124 of the particular environment instance 112 of the native application may be requested by the operating system of the user device 110 and from the native application. For example, the operating system of the user device 110 may send to the request, and receive the uniform resource identifier in response to the request, through an application programing interface (API) configured to communicate with the native applications.

A recipient address is determined for the share, such as by a selection by the user or by a default address. Multiple recipient addresses may also be selected. The user device 110 then sends the message that includes the image 122 of the particular environment instance 112 and the uniform resource identifier 124 to the recipient address (210). The message may be sent, for example, as a text message, a notification, or as a message that is processed by a digital assistant. Other message types can also be used.

In some implementations, the user device 110 generates the message by embedding the uniform resource identifier 124 in image metadata of the image 122. Thus, upon receipt by a user device, such as the user device 130 in FIG. 1B, the image 122 is displayed, but the uniform resource identifier 124 is not readily displayed to the user. In other implementations, the user device includes the uniform resource identifier 124 and the image 122 as separate items that are separately displayed from each other in the display of the user device 130.

The user device 130 may process a navigation command responsive to the message. For example, the user of the user device may "long press" the image 122 if the uniform resource identifier 124 is embedded in the image 122, or may select the uniform resource identifier 124 if the uniform resource identifier is displayed separately from the image.

In response to the navigation command, the user device 130 will instantiate the native application at the particular environment instance 112 addressed by the uniform resource identifier 124. This is shown in the user device 130-B, which has transitioned from the image 122 to the actual environment instance 112.

In some implementations, the environment instance 112 in the receiving user device 130 will be the same as the environment instance 112 in the sending user device 110. This occurs when the native application 112 does not require particular user information and the information in the environment instance 112 is publication information, e.g., not personal information obtained by means of a log-in process specific to the sending user. The uniform resource identifier 124 may also include query parameters and other parameters that the native application processes to arrive at the particular environment instance 112.

The process of instantiating a native application involves launching the native application and processing the uniform resource identifier 124 by the native application. In the event the native application is not installed on the user device 130, the user device may automatically install the native application from a native application provider as part of the instantiation, and then launch the native application. Alternatively, the user may be prompted to confirm installation of the native application.

While the sharing of an image of an environment instance 122 and a corresponding uniform resource identifier 124 has been described in the context of a share command from a contextual information card, the sharing of such information can also be provided independent of a contextual information card. For example, another type single input operating system command may be used to generate the message that includes the image 122 of the particular environment instance 112 and the uniform resource identifier 124 without requiring the display of the contextual card 160 with the share command. One example of such a command is the pressing of the button 111 according to a predetermined sequence, e.g. four short taps within two seconds.

In another implementation, the message that includes the image 122 and the uniform resource identifier 124 may also include contextual information from the contextual card 160. For example, the contextual information may be a summary of the native application, a review, or other information. Upon receipt of the message, the user device 130-A may allow for the user to "swipe" the image 122 aside to reveal the uniform resource identifier and the contextual information. The user may then choose to launch the native application (or install and launch the native application) by selecting the uniform resource identifier, or may instead review and interact with the contextual information.

Figure 3:
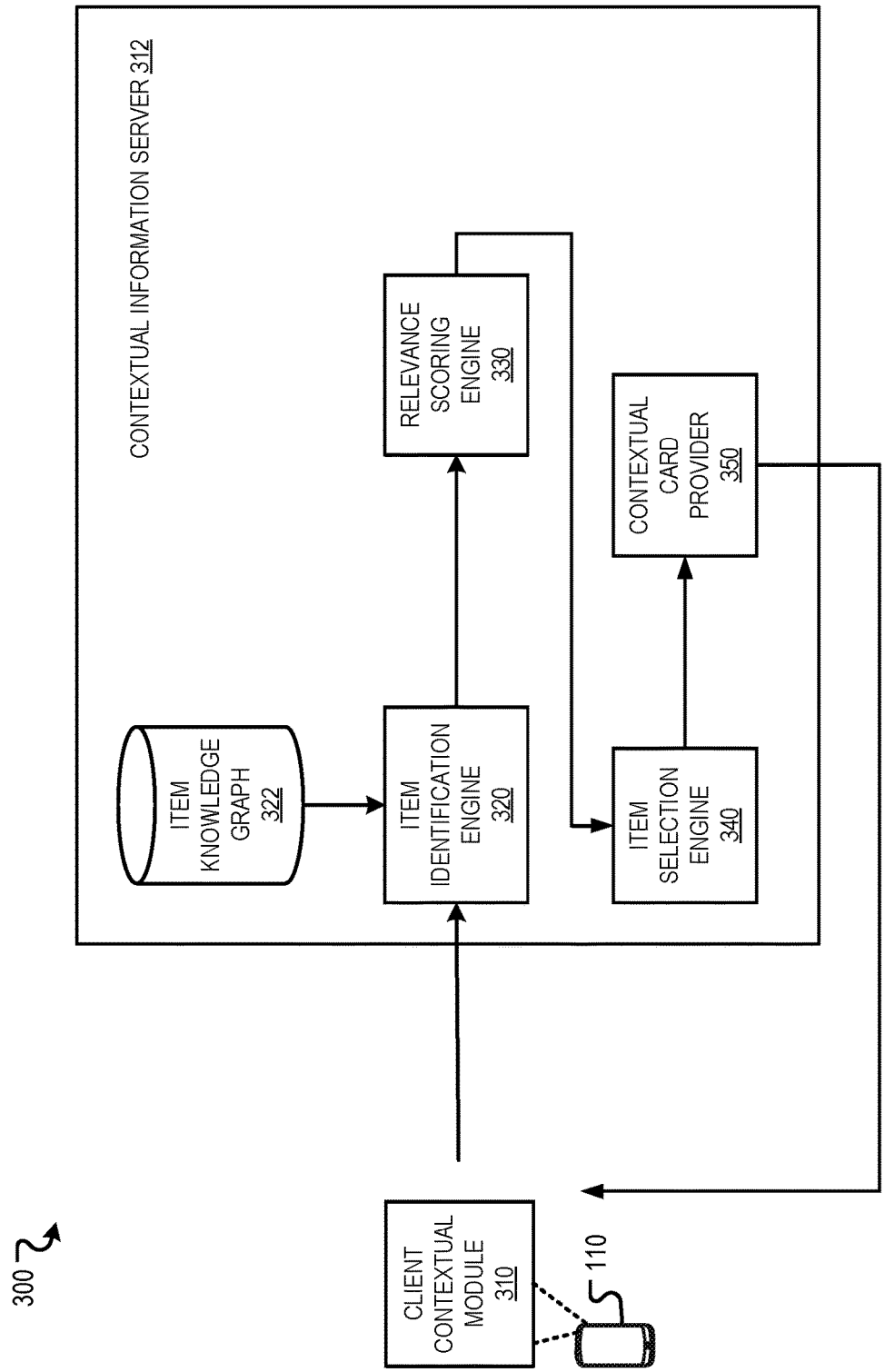
FIG. 3 is a block diagram of example environment in which contextual information is provided for active content.

FIG. 3 is a block diagram of an example environment in which contextual information is provided for active content. The environment 300 includes a client contextual module 310 on a user device 110 and a contextual information server 312. The contextual information server 312 includes an item identification engine 320, an item knowledge graph 322, a relevance scoring engine 330, an item selection engine 340, and a contextual card provider 350.

The client contextual module 310 determines that a user desires contextual information for an active content. In response to determining that a user desires contextual information for active content, the client contextual module 310 generates a request to the contextual information server 312 for contextual information for the active content.

The client contextual module 310 may include information about the active content in the request. For example, the client contextual module 310 may generate a screenshot of the active content, provide a tree based document object model that defines what is currently being rendered in an application that is in a foreground and include the model in the request, etc.

In some implementations, the client contextual module 310 may include the information about the active content in the request by additionally or alternatively determining additional information about the request and including the additional information in the request. The additional information about the request may include one or more of a uniform resource identifier for the active content, metadata describing the active content, etc.

The client contextual module 310 then provides the request to the item identification engine 320 without the user entering a query. For example, the client contextual module 310 provides the request to the item identification engine 320 in response to the user providing the indication that the user desires contextual information for the active content, e.g., three rapid button presses, a long button press, or some other indication, without the user providing any further information, e.g., query terms, after providing the indication.

In response to providing the request to the item identification engine 320, the client contextual module 320 receives a contextual card and renders the contextual card. For example, the contextual card 160 of FIGS. 1A and 1B may be received and displayed.

To generate the card 160, the item identification engine 320 receives the request for contextual information and identifies one or more search items from the content in the active resource. A search item may be referred to by a text fragment, e.g., a term or phrase, and search items are distinguishable from one another, e.g., based on context. For example, a search item may be a keyword, and instance of a particular entity, a proper name, an entity or relation modeled by a node or an edge in a knowledge graph, and the like.

The relevance scoring engine 330 may receive the search items identified by the item identification engine 320 and determine a relevance score for each of the search items. A variety of relevance scoring processes may be used. For example, the relevance score may reflect a confidence that the search item is relevant to the user, i.e., a degree of confidence that the user would like to see contextual information about the search item. The relevance scoring engine 330 may also determine a relevance score for a search item based on an appearance of the text from which the search item was identified. For example, the relevance scoring engine 330 may determine that the active content is a text message conversation and, in response, determine relevance scores that reflect a higher degree of confidence for search items identified from text that appears closer to the bottom of a screen as that text may be included in more recent messages. In another example, the relevance scoring engine 330 may determine that the active content is an applicant instance, in response, determine relevance scores that reflect a higher degree of confidence for search items identified from text that appears closer to the top of a screen as that text may be more relevant to the native application. Other scoring techniques may also be used.

The item selection engine 340 selects a subset of the search items according to the relevance scores and provides the selection search items to the contextual card provider 350. The contextual card provider 350 may obtain contextual cards including contextual information for the selected search items and provide the contextual cards to the client contextual module 310. For example, the contextual card provider 350 may obtain a description of the native application, and a link to reviews of the native application, and then generate a contextual information card 160 that includes the description and link to reviews.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 4:
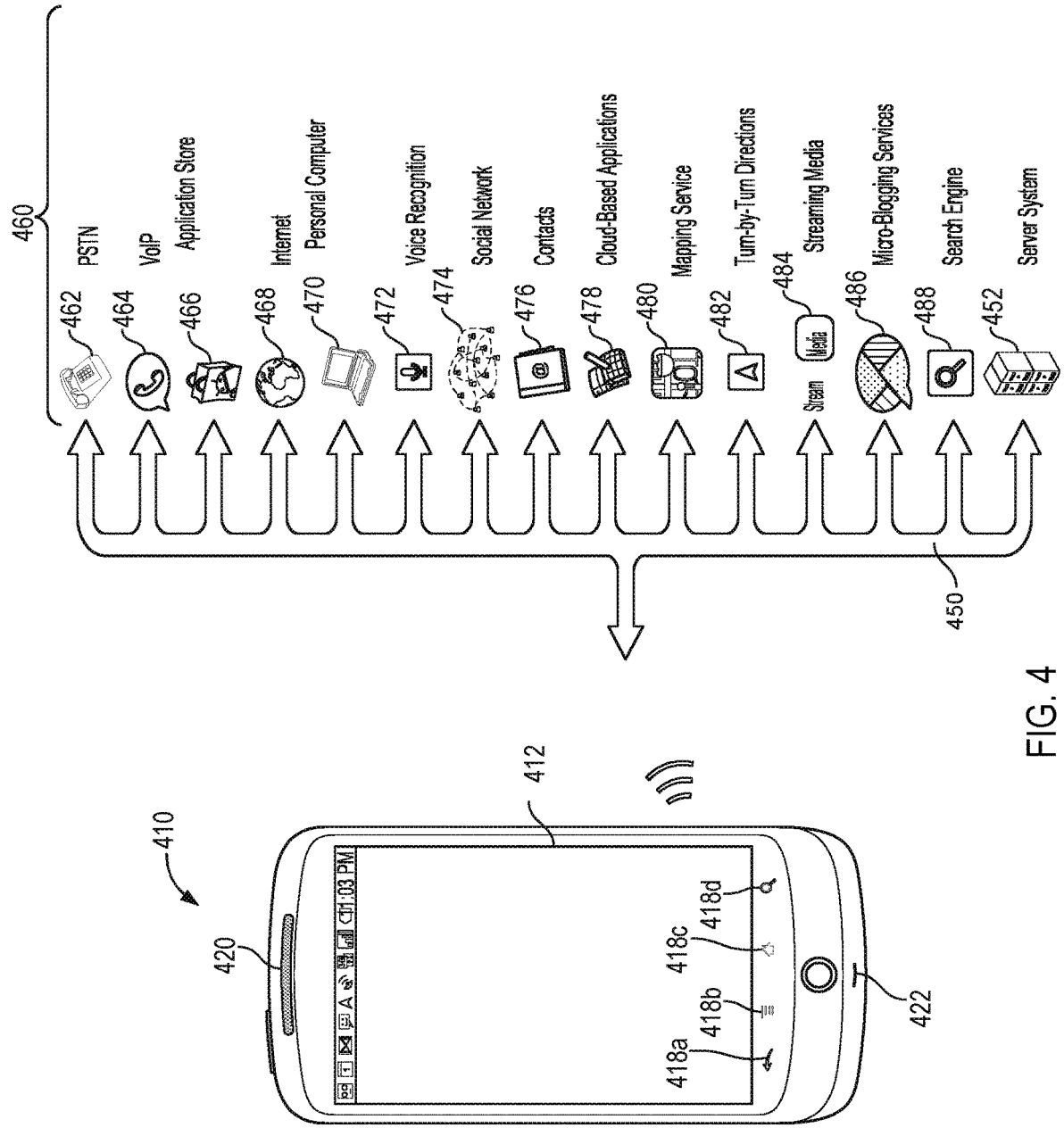
FIG. 4 is a block diagram of an example mobile computing device.

FIG. 4 is a block diagram of example mobile computing device. In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components.

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 512 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. User-selection of the button may invoke the pre-defined action.

The mobile computing device 410 may include other applications, computing sub-systems, and hardware. A voice recognition service 472 may receive voice communication data received by the mobile computing device's microphone 422, and translate the voice communication into corresponding textual data or perform voice recognition. The processed voice data can be input to the command models stored in the command models data 122 to determine whether the voice input used to generate the voice data invokes a particular action for a particular application as described above. One or more of the applications, services and units below may have corresponding actions invoked by such voice commands.

A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the application store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device 410 may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program.

Mapping service 480 can provide the mobile computing device 410 with street maps, route planning information, and satellite images. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 852. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method implemented in a user device, the method comprising:
  displaying, on a display of the user device, active content of a particular environment instance of a native application that can display a plurality of different environment instances,
    wherein the native application is an application operable to generate the plurality of different environment instances for display within the native application on the user device, and
    wherein the active content is a currently displayed portion of a total content of the particular environment instance capable of being displayed;
  receiving, at the user device and while the active content of the particular environment instance is an active focus of the display, a single input operating system command that is a command invoked independent of the native application;
  in response to the single input operating system command:
    generating a query-independent request for text or multimedia content relevant to the active content;
    transmitting the query-independent request to a search system; and
    receiving, from the search system, the text or multimedia content,
      wherein the text or multimedia content is responsive to the query-independent request and includes at least one of: text content, audio content, and video content;
  displaying, on the display, a content sharing card that includes a share command and the text or multimedia content; and
  in response to a selection of the share command during display of the content sharing card:
    determining a recipient address specifying a recipient device that is separate from the user device;
    accessing viewport display data of the native application;
    generating, based on the viewport display data of the native application, an image of the active content of the particular environment instance of the native application;
    selecting a uniform resource identifier of the particular environment instance of the native application;
    generating a message that includes the image of the particular environment instance and the uniform resource identifier; and
    sending, to the recipient address, the message that includes the image of the active content of the particular environment instance and the uniform resource identifier.

2. The computer-implemented method of claim 1, wherein generating the message that includes the image of the particular environment instance and the uniform resource identifier comprises embedding the uniform resource identifier in image metadata of the image, wherein in response to a navigation command on the image at the recipient device receiving the message the recipient device will instantiate the native application at the particular environment instance addressed by the uniform resource identifier.

3. The computer-implemented method of claim 1, wherein generating the message that includes the image of the particular environment instance and the uniform resource identifier comprises including the uniform resource identifier and the image as separate items that are separately displayed, and wherein in response to a navigation command on the uniform resource identifier at the recipient device receiving the message the recipient device will instantiate the native application at the particular environment instance addressed by the uniform resource identifier.

4. The computer-implemented method of claim 1, wherein selecting the uniform resource identifier of the particular environment instance of the native application comprises selecting the uniform resource identifier from a user device cache of most recently used uniform resource identifiers.

5. The computer-implemented method of claim 1, wherein selecting the uniform resource identifier of the particular environment instance of the native application comprises requesting, by the operating system of the user device and from the native application, the uniform resource identifier of the particular environment instance.

6. A user device comprising:
  a memory device that stores a set of instructions;
  a display; and
  at least one processor that executes the set of instructions to:
  display, on the display, active content of a particular environment instance of a native application that can display a plurality of different environment instances,
    wherein the native application is an application operable to generate the plurality of different environment instances for display within the native application on the user device, and
    wherein the active content is a currently displayed portion of a total content of the particular environment instance capable of being displayed;
  receiving, at the user device and while the active content of the particular environment instance is an active focus of the display, a single input operating system command that is a command invoked independent of the native application;
  in response to the single input operating system command:
    generating a query-independent request for text or multimedia content relevant to the active content;
    transmitting the query-independent request to a search system; and
    receiving, from the search system, the text or multimedia content,
      wherein the text or multimedia content is responsive to the query-independent request and includes at least one of: text content, audio content, and video content;
  displaying, on the display, a content sharing card that includes a share command and the text or multimedia content; and
  in response to a selection of the share command during display of the content sharing card:
    determining a recipient address specifying a recipient device that is separate from the user device;
    selecting a uniform resource identifier of the particular environment instance of the native application;
    generating a message that includes at least a portion of the text or multimedia content and the uniform resource identifier of the particular environment instance of the native application; and
    sending, to the recipient address, the message that includes the at least the portion of the text or multimedia content and the uniform resource identifier of the particular environment instance.

7. The user device of claim 6, wherein the recipient device will instantiate the native application, at the recipient device, at the particular environment instance addressed by the uniform resource identifier in response to a selection of the uniform resource identifier of the message by a recipient user of the recipient device.

8. The user device of claim 7, wherein the uniform resource identifier of the particular environment instance of the native application included in the message includes one or more query parameters that the native application installed on the recipient device processes to arrive at the particular environment instance.

9. The user device of claim 6, wherein selecting the uniform resource identifier of the particular environment instance of the native application comprises selecting the uniform resource identifier from a user device cache of most recently used uniform resource identifiers.

10. The user device of claim 6, wherein selecting the uniform resource identifier of the particular environment instance of the native application comprises requesting, by the operating system of the user device and from the native application, the uniform resource identifier of the particular environment instance.

11. A non-transitory computer readable storage medium storing instructions executable by a user device and upon such execution cause the user device to perform operations comprising:
    displaying, on a display of the user device, active content of a particular environment instance of a native application that can display a plurality of different environment instances,
        wherein the native application is an application operable to generate the plurality of different environment instances for display within the native application on the user device, and
        wherein the active content is a currently displayed portion of a total content of the particular environment instance capable of being displayed;
    receiving, at the user device and while the active content of the particular environment instance is an active focus of the display, a single input operating system command that is a command invoked independent of the native application;
    in response to the single input operating system command:
        generating a query-independent request for text or multimedia content relevant to the active content;
        transmitting the query-independent request to a search system; and
        receiving, from the search system, the text or multimedia content,
            wherein the text or multimedia content is responsive to the query-independent request and includes at least one of: text content, audio content, and video content;
        displaying, on the display, a content sharing card that includes a share command and the text or multimedia content; and
    in response to a selection of the share command during display of the content sharing card:
        determining a recipient address specifying a recipient device that is separate from the user device;
        accessing viewport display data of the native application;
        generating, based on the viewport display data of the native application, an image of the active content of the particular environment instance of the native application;
        selecting a uniform resource identifier of the particular environment instance of the native application;
        generating a message that includes the image of the particular environment instance and the uniform resource identifier; and
        sending, to the recipient address, the message that includes the image of the active content of the particular environment instance and the uniform resource identifier.

12. The non-transitory computer readable storage medium of claim 11, wherein the recipient device will instantiate the native application, at the recipient device, at the particular environment instance addressed by the uniform resource identifier in response to a selection of the uniform resource identifier of the message by a recipient user of the recipient device.

13. The non-transitory computer readable storage medium of claim 11, wherein the uniform resource identifier of the particular environment instance of the native application included in the message includes one or more query parameters that the native application installed on the recipient device processes to arrive at the particular environment instance.

14. The non-transitory computer readable storage medium of claim 11, wherein selecting the uniform resource identifier of the particular environment instance of the native application comprises selecting the uniform resource identifier from a user device cache of most recently used uniform resource identifiers.

15. The non-transitory computer readable storage medium of claim 11, wherein selecting the uniform resource identifier of the particular environment instance of the native application comprises requesting, by the operating system of the user device and from the native application, the uniform resource identifier of the particular environment instance.

* * * * *